May 19, 1953 T. A. FEENEY ET AL 2,639,108
AIRPLANE TRIM CONTROL
Filed April 30, 1948 3 Sheets-Sheet 2
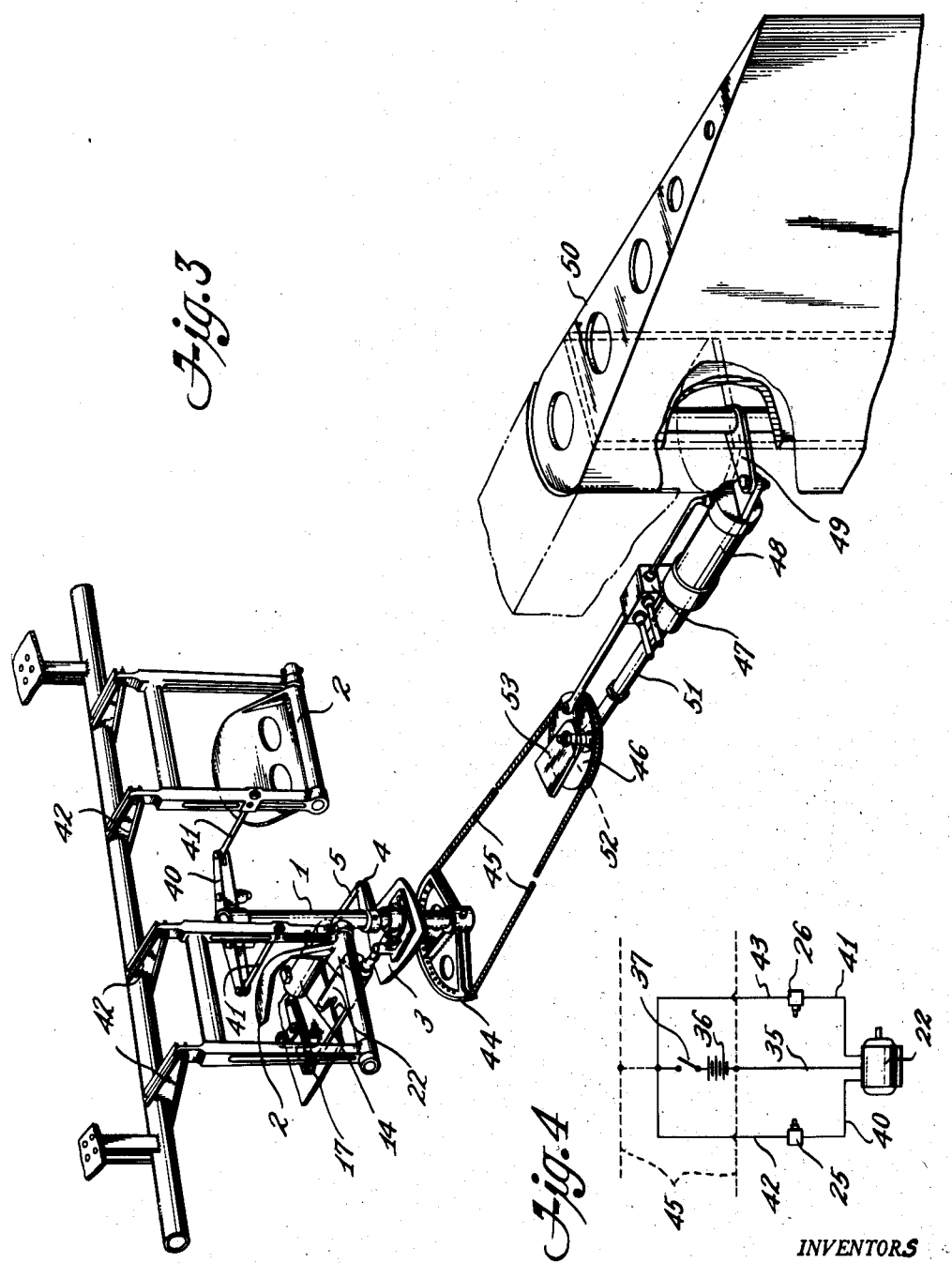
INVENTORS
THOMAS A. FEENEY
BY STANLEY A. HALL
Hubert E. Metcalf
Attorney May 19, 1953

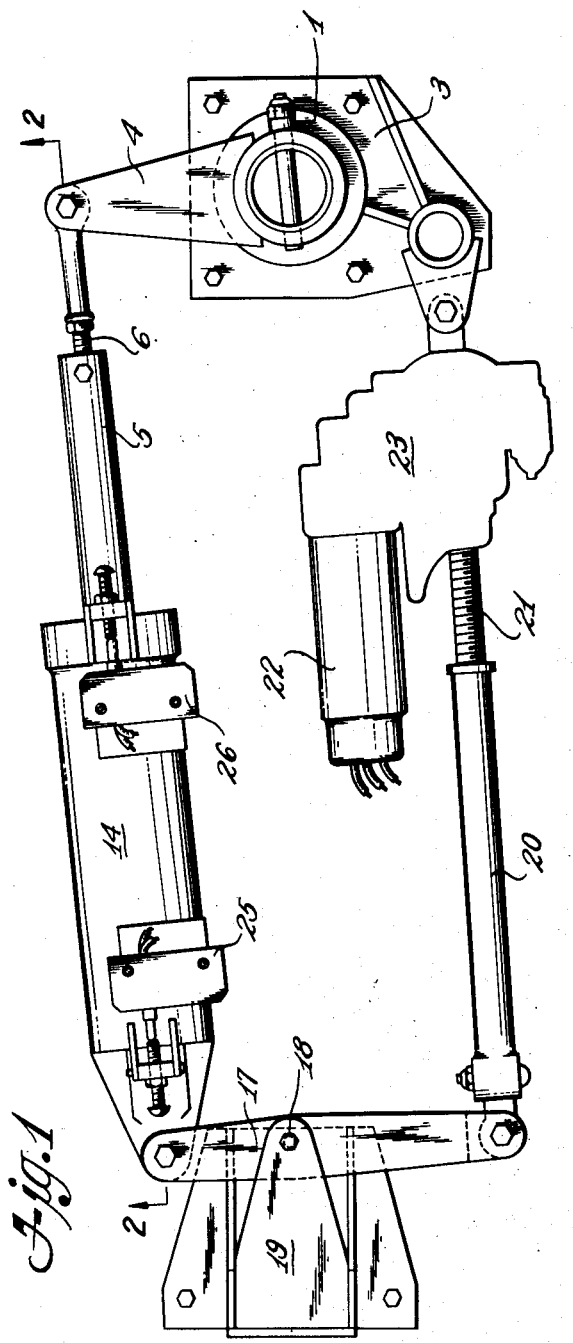
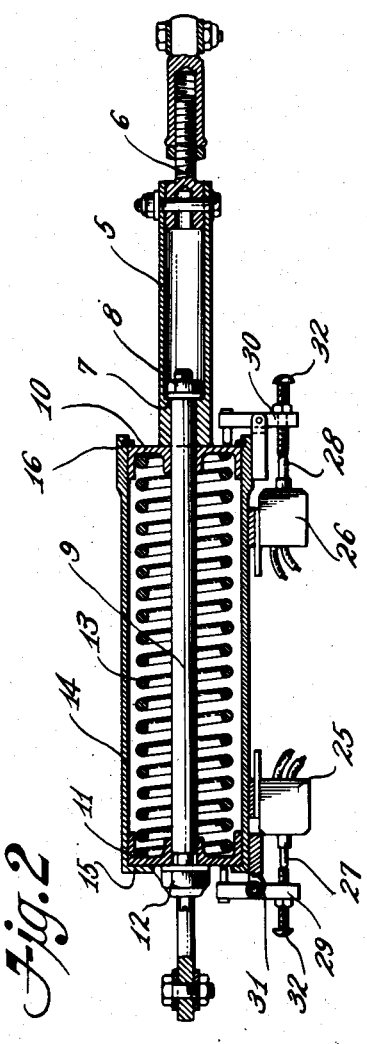

T. A. FEENEY ET AL 2,639,108

AIRPLANE TRIM CONTROL

Filed April 30, 1948

INVENTORS
THOMAS A. FEENEY
BY STANLEY A. HALL

Herbert E. Metcalf
Attorney

Patented May 19, 1953

2,639,108

UNITED STATES PATENT OFFICE 2,639,108

AIRPLANE TRIM CONTROL

Thomas A. Feeney, Los Angeles, and Stanley A. Hall, Gardena, Calif., assignors to Northrop Aircraft, Inc., Hawthorne, Calif., a corporation of California Application April 30, 1948, Serial No. 24,226

14 Claims. (Cl. 244—83)

Our invention relates to airplane trim controls and more particularly to a means and method of trimming an airplane by utilizing the main control surfaces thereof.

In high speed airplanes, particularly multimotored pursuit or combat types, it is frequently necessary to have only a single pilot available for the controls of the airplane. Due to the ever increasing use of instruments additional to engine condition indicators, such as radar for example, the trimming of the airplane quickly and efficiently becomes a major task for the pilot, particularly for sudden out-of-trim moments that might take place while the pilot's attention is otherwise directed. The usual sequence of pilot response to an out-of-trim moment is, first, the use of the normal controls by manual application of control column and rudder pedal forces, and then the operation of various trim tabs until trim is restored, thus releasing the pilot from maintaining the control forces.

The customary trimming procedure, however, entails sequential operation of one or more of the trim control elements for elevation, direction, and lateral trim by the pilot as may be needed, which distracts the pilot's attention from what might well be other important operations. It is, therefore, an object of the present invention to provide a quick and efficient centralizing and trim system that will normally centralize the controls, automatically maintain trim and, in addition, will remove control element trim forces with only momentary attention by the pilot. Another object of the invention is to provide a trim system utilizing the normal airplane control surfaces which may, if desired, be completely power operated.

When control surfaces are full power actuated, as, for example, by a hydraulic servomotor, the pilot cannot "feel" any of the aerodynamic forces acting on the control surfaces. In consequence, it is customary when the surfaces are full power operated to utilize balanced elastic restoring forces applied to the control column and rudders so that the control element neutrals substantially correspond to normal operating neutrals. It is, therefore, another object of the present invention to provide a means and method of shifting the control neutral away from the normal operating neutral of one or more control elements to compensate for out-of-trim moments.

Other advantages and objects of the invention will be apparent from the ensuing description of a preferred form of control centralizing and trim system embodying the present invention.

In the drawings:

Figure 1 is a top plan view of a preferred form of control centralizing means embodying the present invention.

Figure 2 is a sectional view taken as indicated by the line 2—2 in Figure 1.

Figure 3 is a perspective view showing how the system of Figure 1 is applied to rudder control.

Figure 4 is a schematic wiring diagram for the operation of the device of Figure 1.

Figure 5:
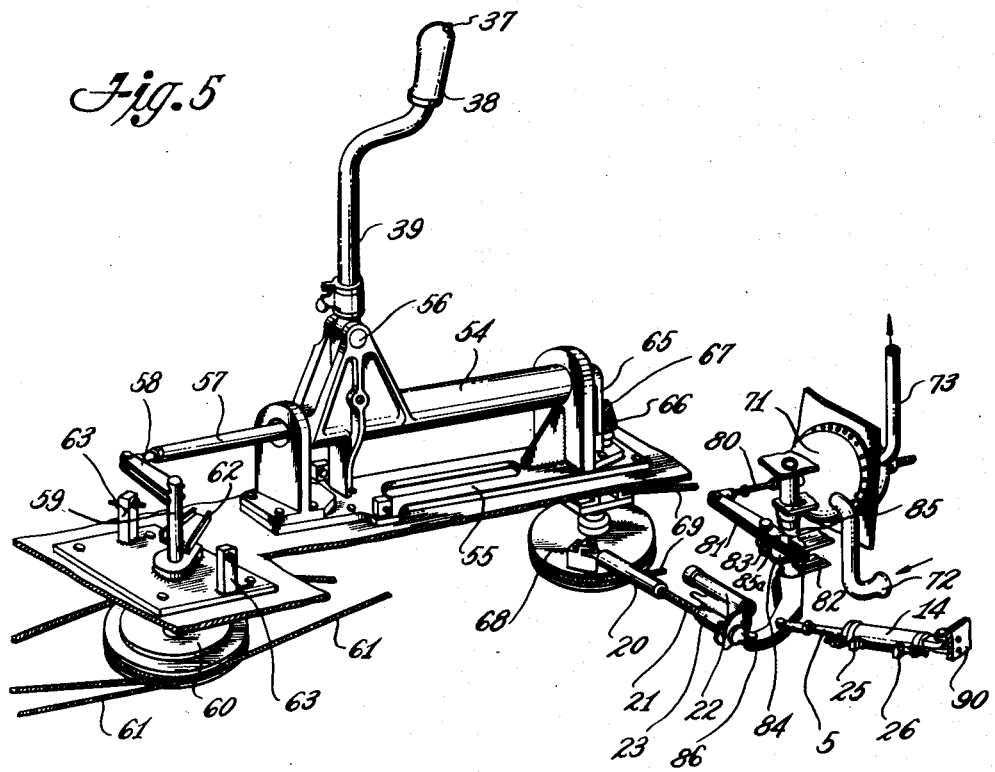
Figure 5 is a perspective view showing the present invention as applied to an elevator control.

Referring first to Figures 1, 2, and 3, a pilot operated control of the airplane, such as the rudder pedal assembly shown in Figure 3, for example, is connected to a torque tube 1 rotated in accordance with the movement of rudder pedals 2. Torque tube 1 rotates in a bearing plate 3 attached to the airframe and carries a lever 4 attached to a spring operating rod 5 through an adjustment screw 6. Spring operating rod 5 is hollow, and is provided with an end shoulder 7 which bears against an internal nut 8 on one end of a tension rod 9 as shown in Figure 2. Tension rod 9 passes through one spring cap 10 and then through a second and opposite spring cap 11 to terminate in a second rod nut 12. A spring 13 is placed between spring caps 10 and 11, and caps 10 and 11 are movable within a spring casing 14, being held from leaving the casing at one end by casing end 15 and at the other end by split ring 16. Spring operating rod 5 bears against, but is not attached to, spring cap 10.

Spring casing 14 is hingedly attached to one end of link 17 rotating on axle 18 fastened to link fitting 19, attached to the airframe; and the other end of link 17 is attached to a screw jack rod 20 having an internal screw 21. Screw 21 is rotated by a reversible motor 22 through gear box 23, and gear box 23 is hingedly attached to bearing plate 3.

This arrangement, considering a predetermined condition of screw and jack rod and no compression of spring 13, will position lever 4 and, consequently, torque tube 1 and attached rudder pedals 2 in a predetermined neutral position which normally is the position from which the attached control surfaces are moved for aerodynamic control of the airplane. Thereafter, movement of the control in either direction will compress spring 13 to supply a restoring or centralizing force to the pilot's pedals, acting as follows:

When lever 4 is moved toward the spring casing, spring rod 5 bears against cap 10 to compress the spring as the opposite cap 11 cannot move because the casing is fixed by the attached linkage. In this case, spring rod 5 slides over tension rod 9.

In the reverse direction, when lever 4 is moved away from the spring casing 14, shoulder 7 on spring rod 5 picks up nut 8 on tension rod 9, moves the tension rod 9 and spring cap 11 to again compress the spring 13 to supply the restoring force. Thus, the neutral point is determined by the position of casing 14 in space. This position can be changed by operation of motor 22 which will, of course, change the position of casing 14 in space through the attached linkage, thus moving the rudder pedals. If, however, the initial neutral as determined by position of casing 14 placed the control surfaces in the normal operating neutral, when the casing is moved the rudder pedals will no longer be in normal operating neutral but will be in a position where attitude changing moments are produced on the airplane. Thus, operation of motor 22 can position the pilot control and attached surface or surfaces to compensate for out-of-trim moments without the necessity of continuously applied pilot force; i. e., the rudder pedals will stay in the trim position. Spring 13 can, because of the casing restriction be preloaded to any desired value.

The device, even so far described, can be used for manual trim by manual operation by the pilot of motor 22 in the desired direction. However, an additional aspect of the present invention permits the pilot, merely by pressing a single button, to cause the control neutral to be held at the position of the rudder pedals when the button was pressed.

This aspect of the invention is attained by a pair of sensing switches 25 and 26 positioned one on each end of spring casing 14. These switches, normally open, each have outwardly urged switch operating plungers 27 and 28 respectively, bearing against one end of cap levers 29 and 30 respectively, the other ends of the respective cap levers beairng against caps 11 and 10. The levers may be spring pressed against caps 10 and 11 as by axial springs 31. Thus, when either spring cap 10 or 11 moves inwardly the plunger of the associated switch can move outwardly to close an electrical circuit. Adjustment can be made by adjustment screws 32.

The sensing switches 25 and 26 are utilized to run reversible motor 22 in the desired direction by inclusion in an electrical circuit shown schematically in Figure 4.

Here a common wire 35 of motor 22 leads to a power source such as battery 36 and thence to a control column trim switch 37 mounted on the hand grip 38 of a control stick 39 as shown in Figure 5. One reversing winding wire 40 of motor 22 leads to one sensing switch 25, the other reversing winding wire 41 leading to the other sensing switch 26. Power wires 42 and 43 from switches 25 and 26 respectively are joined and connected to the other end of power source 36 through the pilot's trim switch 37.

The trim and centralizing system as described may be attached to the rudder pedals 2 as shown in Figure 3 for example.

Here, torque tube 1 is mounted vertically in the airplane and is connected above through pedal lever 40 and rods 41 to the rudder pedals 2 which rock in brackets 42 attached to the airframe. Adjacent to the lower end of torque tube 1 it carries lever 4 and passes through bearing plate 3 to which the trim and centralizing system as previously described is attached.

Below bearing plate 3 the torque tube 1 terminates in a rudder cable quadrant 44 operating rudder cables 45 extending around a cable drum 46 operating a hydraulic valve 47 attached to a hydraulic cylinder 48.

Hydraulic cylinder 48 is attached to a rudder operating arm 49 attached to rudder surface 50, and piston rod 51 emerging from cylinder 48 is terminated on drum axle 52 attached to the airframe by fitting 53. This general type of full power control is illustrative only of means to operate the rudder and is no part of the present invention, being shown, described and claimed in a co-pending application, Serial No. 23,567, filed April 27, 1948, now abandoned.

All switches are open with the rudder pedals in normal central operating position. As the rudder pedals are operated in normal flight, the spring 13 is compressed to provide the desired centralizing force, and switches 25 and 26 are closed in accordance with the direction of rudder movement, but as both sensing switches 25 and 26 are in series with the trim switch 37, the motor 22 is not operated.

When, however, the spring 13 is compressed, one sensing switch is closed and if the pilot desires that the rudder pedals have a new neutral he presses his trim switch 37 to operate the motor in the direction sensed by the closed sensing switch. The motor is connected to run in the direction to decompress the spring 13, and when spring casing 14 reaches a point in space where both sensing switches are again open, motor 22 stops even though the pilot's trim switch 37 is still closed. Thus, the pilot has only to press the switch long enough to have applied control force disappear and the controls will centralize around the new neutral point.

Power lines 45 can be connected across the battery 36 and the pilot's trim switch 37 connected to trim systems as may be used on other control elements so that when the trim switch is operated, the other controls will simultaneously be operated to trim for all controls simultaneously as will be pointed out later.

When the centering and trimming device of the present invention is applied to other control elements operated by the pilot it may take a slightly different form, shown in Figure 5 as applied to elevators in a full powered control system utilizing a stick control column.

Here the stick 39 is attached to a laterally extending torque tube 54 mounted on a base 55 for rotation in a fore and aft relation, to achieve pitch and climb control. The stick is also movable laterally on pivot pin 56 for aileron control through central push rod 57, lever arm 58, axle 59, and pulley 60 to which cables 61 for aileron control are attached. Stop arm 62 attached to axle 59 bears against stops 63 to limit the stick travel for aileron control.

For elevator control, the torque tube 54 is provided on the end opposite the aileron linkage with a gear sector 65 meshing with bevel gear 66 mounted on a vertical shaft 67 extending downwardly to terminate in an elevator pulley 68 to which elevator cables 69 are attached for operation of the elevators, preferably by controlling a hydraulic motor similar to the rudder motor previously described.

As it is desirable that at least a simulated aerodynamic "feel" be applied to the elevator controls in order that the pilot may be made aware of the approach to stalling conditions, the elastic restoring forces in this case are composite, means being provided to provide an aerodynamic restoring force in addition to the spring type of centering device previously described.

Briefly, the aerodynamic centering device comprises an aerodynamic bellows comprising a casing 71 containing a diaphragm (not shown) on one side of which is applied a pressure due to the forward speed of the airplane, as by an air scoop 72, the other side of the diaphragm being connected into the airflow over the upper surface of the wing, for example, by conduit 73 in order to provide a reduced pressure on the diaphragm. In normal flight a strong urge in one direction is thus given to the diaphragm, this urge decreasing as stall conditions are approached. This urge is then applied to the elevator controls as they are moved in either direction away from central or neutral position so that the pilot may "feel" the reduced force when stall conditions are approached. This type of device has been fully described and claimed in U. S. application, Serial No. 567,683, filed December 11, 1944, now U. S. Patent No. 2,559,817, issued July 10, 1951.

In this case, the diaphragm in the bellows casing 71 is attached to push rod 80 extending out of the casing 71 and is attached to one end of a cam lever 81 having the other end rotatably attached to frame fitting 82. Cam lever 81 carries a cam roller 83 positioned to contact a sector cam 84 on a vertical cam shaft 85. Sector cam 84 is provided with a central indent 85a and the forces are arranged in the bellows to urge the roller 83 into the indent 85a.

The lower end of cam shaft 85 is provided with a feedback lever 86 connected at the end thereof with gear box 23 carrying motor 22 to operate jack screw 21 entering screw jack rod 20 which in this case attaches to elevator cable pulley 68.

In addition, the spring casing 14 and appurtenances thereof as shown in Figure 2 is attached to a casing frame fitting 90, with spring operating rod 5 extending from the casing to attach to feedback lever 86.

In operation, the distance between pulley 68 and feedback lever 86 is adjusted so that the stick 39 is kept at a desired central or neutral point from which it is desired to operate the elevators in either direction in normal flight, spring 13 in casing 14 thereafter providing the centralizing forces when no forces are present from the bellows. The cam 84 and roller 83 are, however, positioned so that when the stick is in elevator neutral, the roller is bottomed in cam indent 85a, so that in flight, elevator movement of the stick in either direction causes the centralizing force of spring 13 to be applied to the stick, and also causes the force developed by the bellows to be likewise applied, as any cam rotation will cause the bellows push rod 80 to be moved against the force being developed by the diaphragm casing 71. If desired, cam 84 can be contoured to provide a different restoring force for pitch and climb movements of the stick.

It will be noted that any change in distance between pulley 68 and arm 86 by operation of motor 22 will change the stick position and therefore the position of the control surfaces controlled by elevator pulley 68, with relation to the central position of cam 84 and spring 13. Thus, when stick 39 is held in an elevator position to compensate for out-of-trim moments, spring 13 will be compressed, and cam roller 83 will be riding on one side of the cam indent. The compression of spring 13 will, of course, close one or the other of the sensing switches 25 or 26 connected to the motor 22 and battery as in Figure 4 so that when the pilot's trim switch 37 is closed the motor 22 will operate to bring both the spring 13 and cam 84 back to a central position, thus leaving the stick in a new neutral position where the out-of-trim moment is being compensated for by the new position of the elevators.

Thus, when both elevator and rudder centralizing and trim systems are connected to be operated by the trim switch 37, trim is simultaneously achieved in both attitudes in accordance with stick and rudder pedal positions.

It will be noted that the centralizing and trim assembly of Figure 1 and that of Figure 5 are essentially the same in that in both a composite link extends from the pilot's control to an airframe support. In this composite link an extensible rod is in series with the spring assembly in both cases. The only difference between the two links is that in one case (Figure 1) one end of the extensible link is fixed and the casing is moved when the length of this link is changed. In the other construction (Figure 5) one end of the casing is fixed and change in length of the extensible link moves the spring operating rod. Thus, relative movement of the casing and spring operating rod takes place to relieve spring compression in both cases, and the operation of motor 22 in both cases changes the overall length of the composite link to change the pilot's control neutral as desired.

In the embodiments shown, no trim system is shown for use on the ailerons. However, if found desirable, it is deemed to be within the knowledge of those skilled in the art to apply the present invention to such additional control elements.

Further, as the preferred embodiments of the invention described herein are illustrative only of the principles involved in the present invention, we do not desire to be limited by the particular means shown herein, nor by the particular elastic centering means shown. The method involved is adaptable to a large number of structural equivalents that will be apparent to those skilled in the art within the scope of the appended claims.

While the term "pilot" has been used herein as indicating a human being, it will be obvious to those skilled in the art that automatic piloting devices can be used in the operation of the airplane controls, without changing the operation of the invention described and claimed herein. The term "pilot," therefore, is used herein and in the appended claims as including both human and mechanical pilots.

What is claimed is:

1. In combination with an airplane control, elastic means exerting opposed restoring forces on said control from predetermined points in the airplane having said control to maintain said control in a neutral position, power operated means, including a power circuit, connected to shift said points in said airplane when energized, sensing means associated with the elastic means and included in said power circuit for detecting the direction of movement of said control by the pilot against one or the other of said restoring forces, and means operated by the pilot of said airplane to complete the power circuit for energizing said power operated means and to move said points in said airplane in the direction determined by said sensing means to equalize said restoring forces at a new neutral position.

2. In combination with an airplane control element, a trim system comprising a spring casing, end caps sliding within said casing and restrained by said casing at the ends thereof, a spring positioned within said casing and bearing against said end caps, link means connected to said control element and to said end caps to move one or the other of said end caps in said casing against said spring in accordance with the direction of movement of said control element to create a neutral point predicated on the position of said casing in the airplane having said control element along the axis of said casing, power operated means including a power circuit connected to axially move said casing in said airplane, a sensing element connected to be operated by movement of one end cap, a second sensing element connected to be operated by movement of the other end cap, each of said sensing means included in the power circuit, and means operable at will to close the power circuit to cause said power operated means to move said casing in accordance with the operation of one of said sensing elements.

3. In combination with an airplane control, a trim system comprising a spring casing element, end caps sliding within said casing and restrained by said casing at the ends thereof, a spring positioned within said casing and bearing against said end caps, a link element connected to said control and bearing against said end caps to move one or the other of said end caps against said spring in accordance with the direction of movement of said control to develop restoring forces determining a neutral point predicated on the length of said link element, power operated means connected between the ends of said link element to change the length of said link element, a sensing element connected to be operated by movement of one end cap, a second sensing element connected to be operated by movement of the other end cap, each of said sensing means in said power operated means, and means operable at will to cause said power operated means to change the length of said link in accordance with the operation of one of said sensing elements.

4. Apparatus in accordance with claim 2, wherein said power operated means is a reversible electrical motor, wherein said sensing elements are electrical switches, and wherein said means operable at will includes a pilot operated switch.

5. Apparatus in accordance with claim 3, wherein said power operated means is a reversible electrical motor, wherein said sensing elements are electrical switches, and wherein said means operable at will includes a pilot operated switch.

6. Apparatus in accordance with claim 1 wherein a plurality of power-operated means are connected in parallel with said power circuit, each power-operated means being part of a separate airplane control combination including separate elastic means and separate sensing means cooperating as recited, whereby said pilot-operated means, when actuated, will cause all of said power-operated means to be simultaneously energized in accordance with the condition of their respective sensing means.

7. Apparatus in accordance with claim 2 including a plurality of airplane control elements in combination with a plurality of said trim systems as recited, the power-operated means of each trim system being connected to be simultaneously actuated by said means operable at will in accordance with the operation of one of the respective sensing elements of each system, whereby all of said control elements will be trimmed simultaneously by the operation of said means operable at will.

8. Apparatus in accordance with claim 3 including a plurality of airplane controls in combination with a plurality of said trim systems as recited, the power-operated means of each trim system being connected to be simultaneously actuated by said means operable at will in accordance with the operation of one of the respective sensing elements of each system, whereby all of said controls will be trimmed simultaneously by the operation of said means operable at will.

9. In combination with an airplane pilot control, a trim system comprising a control centering assembly having a spring casing element, end caps sliding within said casing and restrained by said casing at the ends thereof, a spring positioned within said casing and bearing against said end caps, and an operating rod member associated with said end caps to move one or the other of said end caps in said casing against said spring in accordance with the direction of movement of said rod member relative to said casing, said casing and rod each forming an end connection of said control centering assembly; an extensible linkage connected at one end thereof to one end connection of said centering assembly; the opposite end of said extensible linkage and the other end connection of said centering assembly being pivotally connected between said pilot control and the frame of said airplane to determine a neutral control position based on the length of said extensible linkage; power operated means including a power circuit connected to said extensible linkage to change the length thereof; a sensing element connected to be operated by movement of one end cap into said casing; a second sensing element connected to be operated by movement of the other end cap into said casing; each of said sensing means included in said power circuit and means operable by the pilot to close said circuit to energize said power operated means to change said extensible linkage length in accordance with the operation of one of said sensing elements to determine a new neutral control position where said end caps are both bearing against said casing ends.

10. In an airplane having a pilot operated control connected to move an airplane control surface, a composite link connecting said pilot operated control to the frame of said airplane, said composite link comprising an extensible member and an elastic centering assembly connected in series, said centering assembly including an elastic element connected to said extensible member to be compressed upon movement of said control in either direction from a predetermined neutral position on each side of which said centering assembly exerts a restoring force on said control determining a "hands off" position of equilibrium of said control, reversible power operated means including a power circuit connected between the ends of said extensible member to change the length of said extensible member, means in said power circuit for sensing the direction of compression of said elastic element when compressed at any time by pilot movement of said control away from neutral, and single trim control means operated by the pilot to close said circuit to energize said power operated means in the direction automatically determined by said sensing means to decompress said elastic element.

11. In an airplane having a pilot operated control connected to move an airplane control surface, an extensible link connected at one end to said pilot operated control, centering force transmitting means connected to the other end of said extensible link to bias said control to a neutral position dependent upon the length of said extensible link, reversible power operated means connected to said extensible link to change the length thereof, first sensing means adapted to be operated upon movement of said control in one direction from neutral against the centering force applied through said extensible link by said force transmitting means, second sensing means adapted to be similarly operated upon movement of said control in the opposite direction from neutral, an energizing circuit for said power operated means including said sensing means and comprising first direction means adapted to be selected when said first sensing means is operated, second direction means adapted to be selected when said second sensing means is operated, and pilot operated trim control means connected to complete said energizing circuit through whichever of said direction means is selected to neutralize said centering forces at a new neutral position.

12. Apparatus in accordance with claim 11 wherein said centering force transmitting means comprises means for applying a portion of said centering force in accordance with the dynamic air flow produced in the flight of said airplane, and an independent elastic centering assembly connected between said other end of said extensible link and the frame of said airplane to apply the remainder of said centering force in accordance with the deflection of said pilot operated control from neutral.

13. Apparatus in accordance with claim 11 wherein said centering force transmitting means comprises means for applying said centering force in accordance with the dynamic air flow produced in the flight of said airplane.

14. In an airplane having a pilot operated control connected to move an airplane control surface, a composite link connecting said pilot operated control to the frame of said airplane, said composite link including an extensible element and elastic means for applying centering forces to said pilot operated control in series with said extensible element to maintain said pilot-operated control in a desired neutral position in the absence of pilot applied force, power operated means including a power circuit connected to said extensible element to change the length thereof, sensing means in said power circuit for determining the direction of movement of said control from neutral against said centering forces, and pilot operated means for closing the said circuit for energizing said power operated means in the direction determined by said sensing means to neutralize said centering forces at a new neutral control position.

THOMAS A. FEENEY.
STANLEY A. HALL.

References Cited in the file of this patent

UNITED STATES PATENTS

| Number | Name | Date |
|---|---|---|
| 1,855,093 | Bruce et al. | Apr. 19, 1932 |
| 2,373,575 | Lemonier | Apr. 10, 1945 |
| 2,445,343 | Tyra | July 20, 1948 |

FOREIGN PATENTS

| Number | Country | Date |
|---|---|---|
| 602,936 | Germany | Sept. 20, 1934 |